(12) United States Patent
Kappel et al.

(10) Patent No.: US 6,493,604 B1
(45) Date of Patent: Dec. 10, 2002

(54) DATA STORAGE LIBRARY HAVING DUAL MEDIA TRANSPORT ASSEMBLIES

(75) Inventors: Glendon D. Kappel, Eagan; Timothy Carlyle Schooler, Carver, both of MN (US)

(73) Assignee: Plasmon IDE, Inc., Eden Prairie, MN (US)

( * ) Notice: Subject to any disclaimer, the term of this patent is extended or adjusted under 35 U.S.C. 154(b) by 0 days.

(21) Appl. No.: 09/653,650

(22) Filed: Sep. 1, 2000

(51) Int. Cl.$^7$ ................................................ G06F 7/00
(52) U.S. Cl. ........................ 700/213; 700/214; 700/218
(58) Field of Search ................................ 700/213, 214, 700/218; 360/91, 92

(56) References Cited

U.S. PATENT DOCUMENTS

| | | | |
|---|---|---|---|
| 3,831,197 A | * 8/1974 | Beach et al. | 360/92 X |
| 4,941,103 A | 7/1990 | Kato | 364/513 |
| 5,019,762 A | 5/1991 | Kato | 318/568.12 |
| 5,128,912 A | 7/1992 | Hug et al. | 369/38 |
| 5,345,350 A | 9/1994 | Ellis et al. | 360/92 |
| 5,581,522 A | * 12/1996 | Sibuya et al. | 235/462 X |
| 5,610,882 A | 3/1997 | Dang | 369/36 |
| 5,768,141 A | * 6/1998 | Hanaoka et al. | 700/214 X |
| 5,818,723 A | 10/1998 | Dimitri | 364/478.02 |
| 5,956,301 A | 9/1999 | Dimitri et al. | 369/34 |
| 6,038,490 A | * 3/2000 | Dimitri et al. | 700/214 X |
| 6,085,123 A | * 7/2000 | Baca et al. | 700/214 X |
| 6,230,075 B1 | * 5/2001 | Nishijo et al. | 700/214 X |
| 6,304,524 B1 | * 10/2001 | Gallo et al. | 700/214 X |

FOREIGN PATENT DOCUMENTS

| | | | | |
|---|---|---|---|---|
| EP | 0288165 | 10/1988 | | G11B/15/68 |
| EP | 0506489 | 9/1992 | | G11B/15/68 |
| EP | 1052637 | 11/2000 | | G11B/17/22 |
| WO | 98/59339 | 12/1998 | | G11B/15/68 |

* cited by examiner

Primary Examiner—Christopher P. Ellis
Assistant Examiner—Gene O. Crawford
(74) Attorney, Agent, or Firm—Schwegman, Lundberg, Woessner & Kluth, P.A.

(57) ABSTRACT

A data storage library includes a storage section having a plurality of storage slots, a media drive, a guide member proximate the plurality of storage slots, and a pair of media transport assemblies slidably coupled to the guide shaft for transferring data storage media between the storage slots and the media drive. The data storage library is designed so that if one of the media transport assemblies fails, it goes to an end of the guide member and the other media transport assembly continues processing data request.

39 Claims, 7 Drawing Sheets

600

602

SENSING A FAILURE OF A
MEDIA TRANSPORT ASSEMBLY

604

MOVING THE FAILED
MEDIA TRANSPORT ASSEMBLY

606

USING A SECOND MEDIA TRANSPORT
ASSEMBLY TO PERFORM DATA REQUESTS

FIG. 6

DATA STORAGE LIBRARY HAVING DUAL MEDIA TRANSPORT ASSEMBLIES

FIELD OF THE INVENTION

This invention relates to the field of data storage, and more specifically to automated data storage libraries.

BACKGROUND

Businesses are creating and using increasing amounts of data. For instance, the explosive growth of data-intensive applications such as Internet site development, computer-aided design, and data warehousing of inventory, customer lists, and orders or sales, is forcing companies to increase their data storage every year. Data storage systems for holding very large amounts of data are becoming more important.

One such storage system is a data storage library. Data storage libraries are automated systems which combine robotics with software applications to automate data storage functions such as loading and unloading data media cartridges in and out of media drives. Data storage libraries usually include a storage section for holding various data storage media such as magnetic tapes and magnetic and optical disks, a media drive for reading and writing to the data storage media, and an electromechanical transport assembly for moving or swapping the media between the storage sections and the media drives.

Present data storage libraries can be improved. One problem with present storage systems is the speed of data transfer and media swap time. As data libraries get larger, they naturally require more and more time to process a data request. This can negatively affect the speed of the whole computer system. Another problem is unreliability in the event of failure of a transport assembly or other part of the data storage library. Another problem is being able to fit a large amount of data storage media within a given envelope of space.

SUMMARY

In light of these and other needs, methods and systems have been devised for providing a faster and more reliable data storage library. In one embodiment, a data storage library includes a storage section having a plurality of storage slots, one or more media drives, a guide member proximate the plurality of storage slots, and a pair of media transport assemblies slidably coupled to the guide shaft for transferring data storage media between the storage slots and the media drive. The data storage library is designed so that if one of the media transport assemblies fails, it goes to an end of the guide member and the other media transport assembly continues processing data requests.

Another aspect provides a data storage library wherein the guide member is rotatably coupled to a housing and rotates the first and/or second media transport assembly to a storage slot of one of multiple storage sections.

In another aspect, the first and second media transport assemblies both include a first section slidably coupled to the guide shaft and a section rotatably coupled to the first section, and wherein the second section rotates to direct the first and/or second media transport assembly to a storage slot of one of multiple storage sections.

Among other advantages, these embodiments provide increased capacity, reliability, and speed for data storage libraries.

BRIEF DESCRIPTION OF THE DRAWINGS

FIG. 6 shows a flowchart of a method 600 in accord with one embodiment of the present invention.

DETAILED DESCRIPTION

In the following detailed description, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
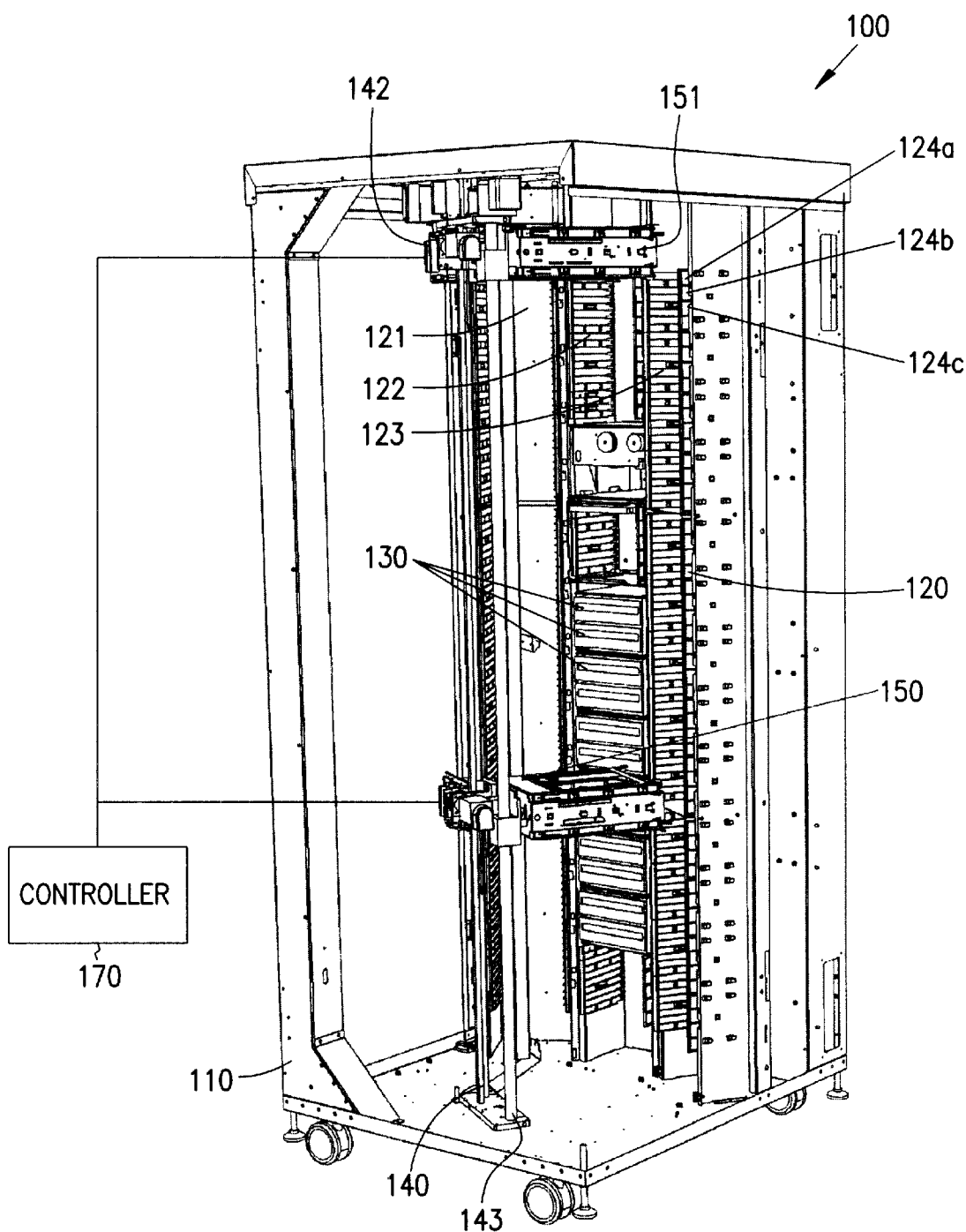
FIG. 1 shows an isometric view of a data storage library according to one embodiment of the present invention.

FIG. 1 shows an isometric view of a data storage library 100 according to one embodiment of the present invention. Data storage library 100 stores vast amounts of data such as inventory, customer lists or any other type of storable information. Typically, data storage library 100 is coupled to a main computer (not shown) or a controller 170, which directs and controls data searches or requests. In some embodiments, data storage library 100 includes an onboard controller for controlling and requesting data searches and/or read/writes.

Exemplary data storage library 100 includes a housing 110, a media storage area 120, one or more media drives 130, a guide member 140, a first media transport assembly 150, and a second media transport assembly 151.

Housing 110 holds the various members of the data storage library. In the exemplary embodiment, housing 110 is a rectangular, box-shaped housing. Some embodiments include a housing which completely encloses the members of data storage library 100. Other embodiments incorporate a frame-like housing leaving one or more sides of the library exposed.

Media storage area 120 is located within housing 110. The exemplary storage area 120 includes three storage sections 121, 122, and 123. Some embodiments utilize a single storage section, others include four or more storage sections. In the exemplary embodiment, each storage section 121–123 has a plurality of storage slots 124a–124n arranged in a vertical column. Each of the plurality of storage slots is adapted for holding one or more data storage media. In one embodiment, each slot has a door covering its front end. In other embodiments, each slot has an open front end for the loading and unloading of data storage media. Almost any type of data storage media is applicable to the present invention. Exemplary media include tapes, magnetic tapes, CD-ROMS, writable CDs, magneto-optical media, DVD, or other modular, removable media. In various embodiments, the media are contained in cartridges, magazines, or other containers.

Media drive or drives 130 are located near storage slots 124a–124n. In the exemplary embodiment, media drives 130 are located within storage section 122. In some embodiments, the media drives are in section 121, section 123, or located next to the storage sections. Media drives 130 read and/or write information on the data storage media. In various embodiments, media drive(s) 130 are a tape drive, a CD-ROM drive, an optical media drive, a read only drive, a read/write drive, or other applicable drive which can read the data storage media.

Guide member 140 is a vertically oriented guide located near the plurality of storage slots 124a–124n. Guide member 140 routes or directs media transport assemblies 150 and 151 in a vertical direction along the front of the storage sections, giving media transport assemblies 150 and 151 access to the slots of the storage sections. In the exemplary embodiment, guide member 140 runs from the top to the bottom of housing 110, thus covering the fill height of sections 121–123.

Media transport assemblies 150 and 151 are slidably coupled to guide member 140. Media transport assemblies 150 and 151 transfer or swap data storage media between storage slots 124a–124n and media drives 130. Second media transport assembly 151 is located above first media transport assembly 150 on guide member 140.

In one embodiment, assembly 151 is temporarily stored at an upper section 142 of guide member 140 while assembly 150 is utilized to transfer the storage media. Assembly 151 is activated if assembly 150 fails. This provides back-up reliability for system 100. In other embodiments, assembly 151 is activated if assembly 150 becomes overworked and cannot keep up with data requests.

In other embodiments, both assemblies 150 and 151 are active at the same time and are separately controlled. This improves the time performance for data searches or other data requests of the system by permitting dual swap action.

In one embodiment, each assembly 150 and 151 covers a unique zone of the storage sections of library 100. Each assembly services request for data in its own zone. In addition, there can be a zone that can be serviced by either of the assemblies. Access to these zones can be controlled and managed by controller 170. In this embodiment, if one of the assemblies fails, the other assembly moves or pushes the failed one out of the way and services the whole library until the failed assembly is repaired. In one embodiment, assembly 150 falls to the bottom of guide member 140 by the force of gravity. This results in no downtime for the system.

Figure 2:
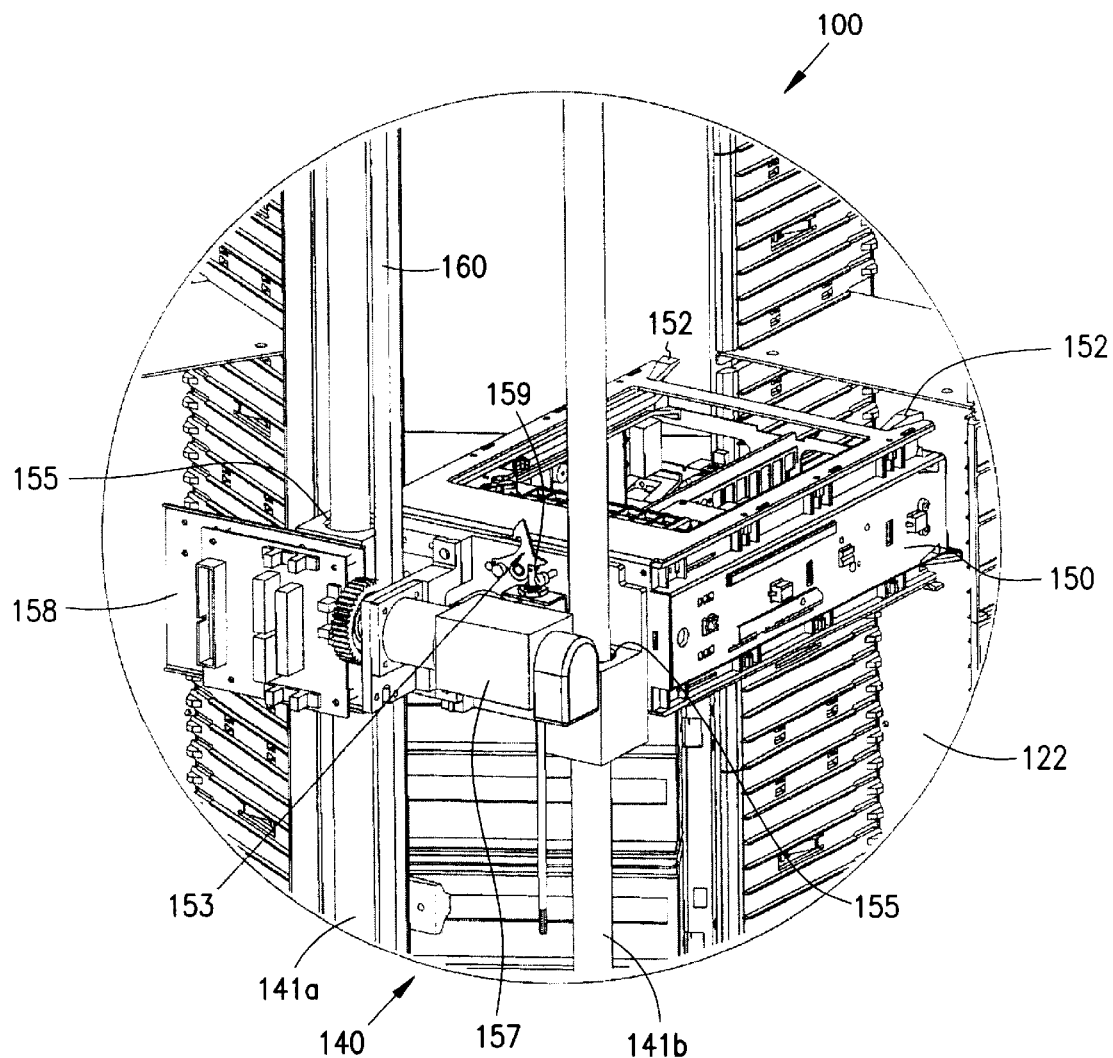
FIG. 2 shows an isometric view of details of a media transport element of FIG. 1.

FIG. 2 shows further details of exemplary guide member 140 and media transport assembly 150. It is noted that in the exemplary embodiment, assemblies 150 and 151 are substantially equivalent. Those skilled in the art will appreciate that in some embodiments, some features may be omitted from a given assembly depending on its function.

Guide member 140 comprises a first guide shaft 141a and a second guide shaft 141b. Other embodiments utilize a single guide shaft or three or more guide shafts. In the exemplary embodiment, each shaft is a circular cross-sectional shaft approximately as high as the storage sections 121–123. In the exemplary embodiment, data storage library 100 also includes a rack gear 160 which runs parallel to guide shafts 141a and 141b.

Each media transport assembly 150 and 151 includes a pair of holes 155 which mate with shafts 141a and 141b to allow the media transport assembly to slide along first guide shaft 141a and the second guide shaft 141b. In some embodiments, the shafts 141a and 141b and the holes 155 are rectangular shaped or other shape. Media transport assemblies 150 and 151 also include a driving member such as pinion gear 156 for driving the assemblies along rack gear 160 up and down guide shafts 141a and 141b. Driving member or pinion gear 156 is driven by a motor 157, which is controlled through controller 170 which is coupled to the motor through an interface 158. Alternatively, media transport assemblies 150 and 151 can be driven along the guide member by driving members such as gears, pulleys and belts, hydraulics, or other mechanisms.

Each media transport assembly 150 and 151 also includes a gripper portion 152 for holding a data storage medium. Gripper portion 152 is a pair of members located on a side of each assembly 150 or 151 which is nearest the storage slots. The gripper members rotate inward to grasp an item such as a data storage medium and rotate outwards to release it. For instance, gripper portion 152 picks a storage medium from a storage slot and places the storage medium into a media drive. Then the gripper portion picks the medium out of the drive and returns it to a storage slot. Other embodiments utilize other types of grippers or pickers which are known in the art.

Second media transport assembly 151 includes a holding member 153 for coupling the assembly to an upper portion 142 of guide member 140 (see FIG. 1). In this embodiment, holding member 153 is a latch. Other embodiments can use a hook, another mechanical fastener, or an electromagnet for holding the media transport assembly in place until it is needed. The exemplary embodiment includes a solenoid 159 connected to holding member 153 for opening and closing the holding member. Other means, such as gears, shafts, or magnets, can also be used to open and close holding member 153. Holding member 153 is latched or otherwise removably coupled to the upper portion of the guide member and is adapted to open if first media transport assembly 150 fails. For instance, controller 170 can send a message to actuate solenoid 159 which opens the holding member and then the controller can activate driving member 156 to control the second assembly.

Figure 3:
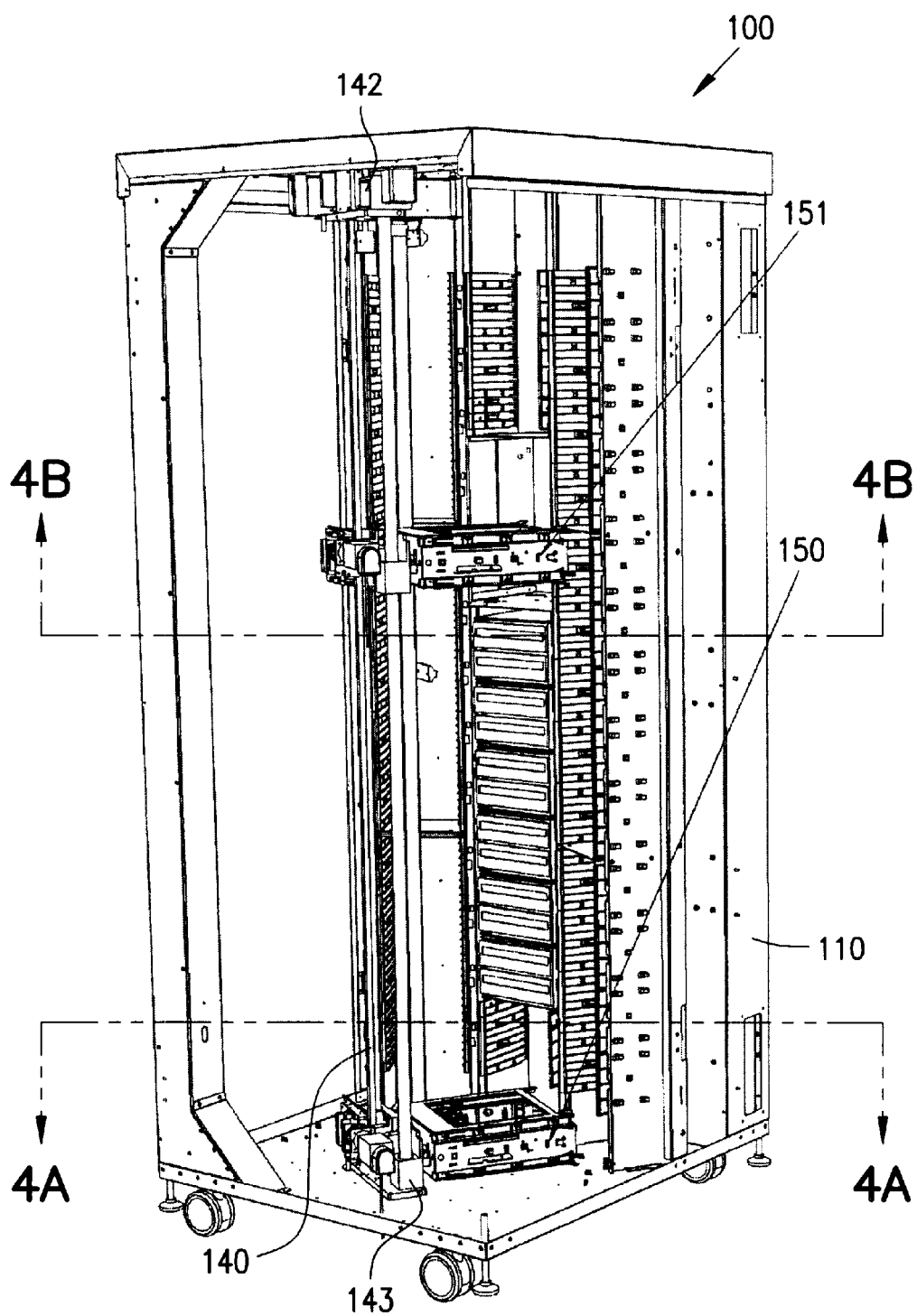
FIG. 3 shows another isometric view of the data storage library of FIG. 1.

FIG. 3 shows another isometric view of data storage library 100 in which media transport assembly 150 has failed and assembly 151 has been activated. Such failure could include problems such as the gripper failing, the motor failing, or other problem. These problems or failures can be sensed by controller 170. For instance, if controller 170 sends an order to the assembly and the assembly is unable to respond, the controller can be programmed to recognize this as a failure.

In some embodiments, when media transport assembly 150 fails, power is cut to motor 157 and the assembly falls by the force of gravity along guide member 140 to a lower portion 143 of the guide member where it is in a non-obstructing position, which is a location where it does not block access to the plurality of storage slots. In other embodiments, controller 170 activates driving member 156 to position the assembly to a non-obstructing position (such as the bottom or the top of guide member 140). In other embodiments, the failed assembly is pushed to the bottom of guide member 140 by non-failed assembly 151.

As noted above, in some embodiments, both assemblies 150 and 151 are utilized and active at the same time. If both are being used, either assembly can push the failed assembly to its respective end of guide member 140. For instance, assembly 150 could push assembly 151 to the top of guide member 140 where assembly 151 could then be latched to the upper portion of the guide member. Assembly 150 could then continue to service data requests.

Figure 4A:
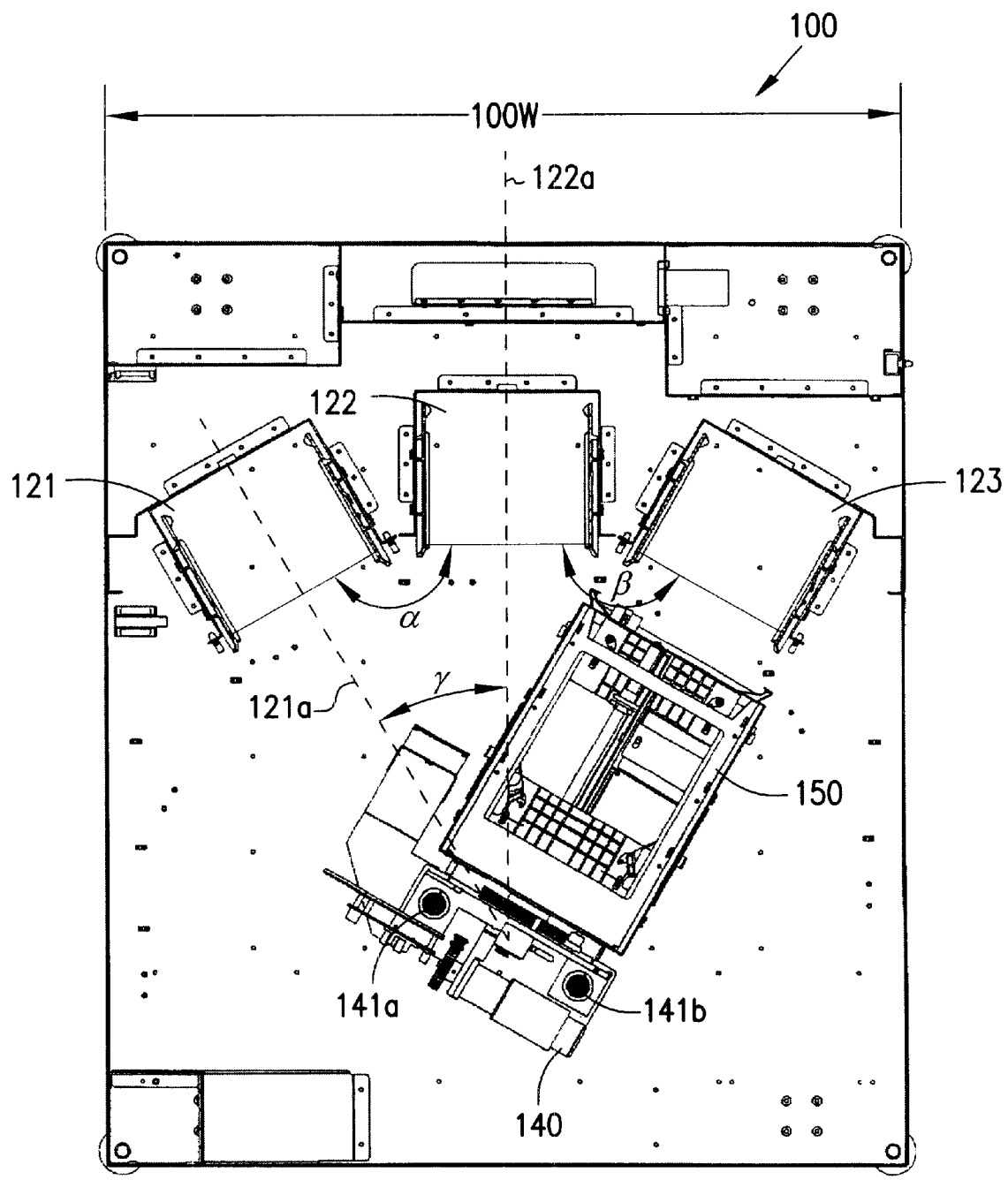
FIG. 4A shows a cross-sectional view of the data storage library of FIG. 1.

FIG. 4A shows a cross-section view of data storage library 100. This view shows further details of an exemplary configuration of sections 121–123. In the exemplary embodiment, the three storage sections 121–123 are arranged in an angular configuration. In one embodiment, the configuration comprises an angle α of 150 degrees between sections 121 and 122 and an angle β of approximately 150 degrees between sections 122 and 123. This means that assembly 150 rotates in an angle γ of about 30 degrees between section 121 and 122 (indicated by centerlines 121a and 122a, respectively), and a corresponding 30 degrees between section 122 and section 123. The angles and configuration discussed above can change depending on the overall geometry of the system. For instance, assembly 150 can be mounted closer or farther from the storage sections and require a different rotation angle. In some embodiments, angles α and β are up to 180 degrees in some they are less than 90 degrees.

By providing an angular configuration, the present embodiment provides for a higher density of storage space relative to the amount of floor space taken up by library 100. In other words, a width 100w of the present embodiment is less than it would be if storage sections 121–123 were in a linear configuration. This smaller size helps fit the library within industry standard spaces. For instance, fitting into industry-standard 19-inch or 24-inch racks.

Figure 4B:
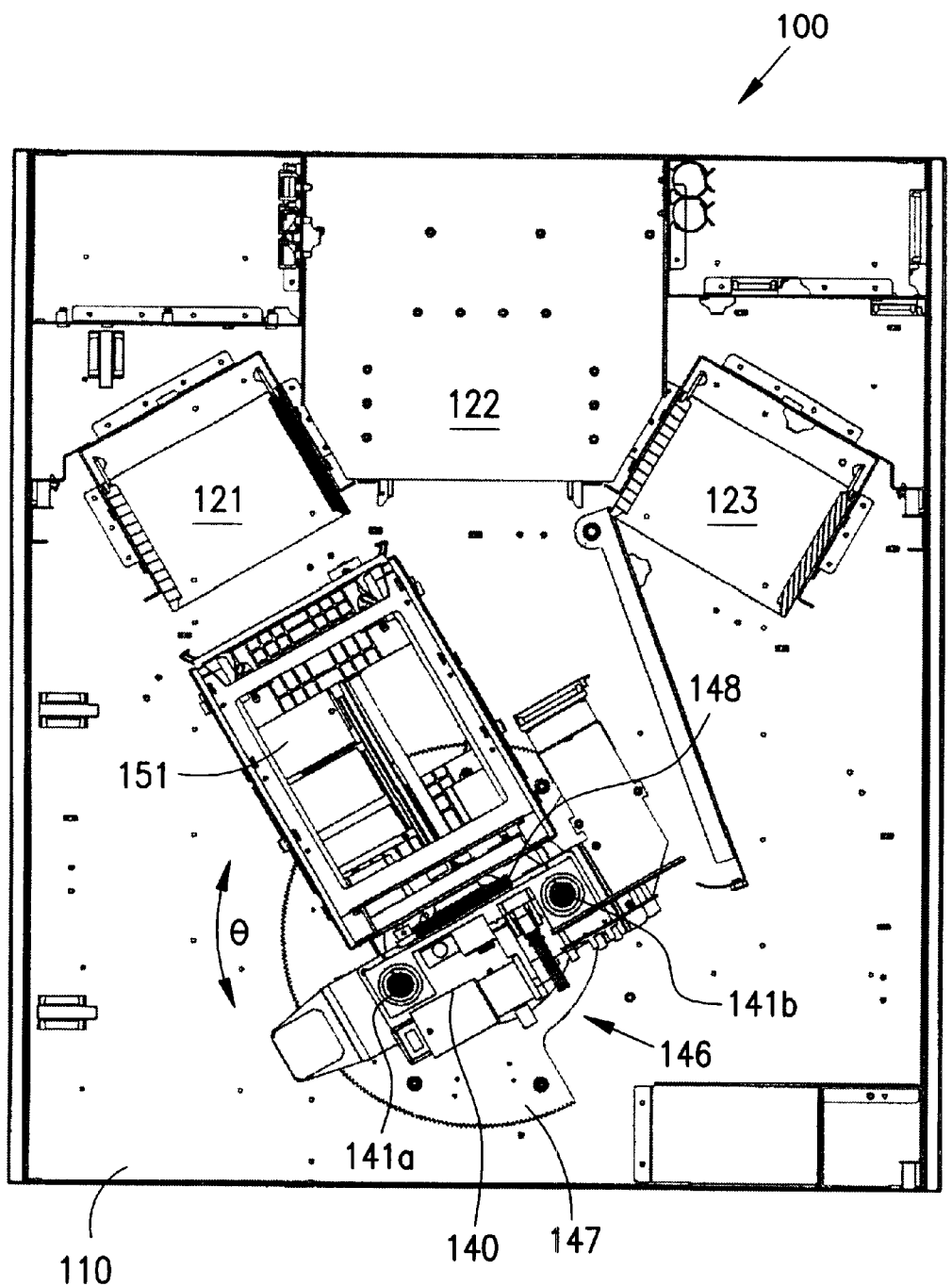
FIG. 4B shows another cross-sectional view of the data storage library of FIG. 1.

FIG. 4B shows a plan view of data storage library 100 showing further details of guide member 140. In this embodiment, guide member 140 is rotatably coupled to housing 110 at a pivot section 146. Pivot section 146 includes a driving member such as gear 147 which rotates guide member 140. As guide member 140 rotates, it directs first and/or second media transport assemblies 151 (and/or 150) to a storage slot of one of the first, second, or third storage sections 121–123 along a radial direction θ. The pivoting of guide member 140 drives the assembly to the column before which it is to be positioned.

In the present embodiment, assembly 151 also includes a driver or gear 148. Gear 148 is driven to turn or flip assembly 151 in a direction either clockwise or counter-clockwise relative to the faces of storage sections 121–123. This is so assembly 151 can insert and remove media which are readable and/or writable on both sides.

Figure 5:
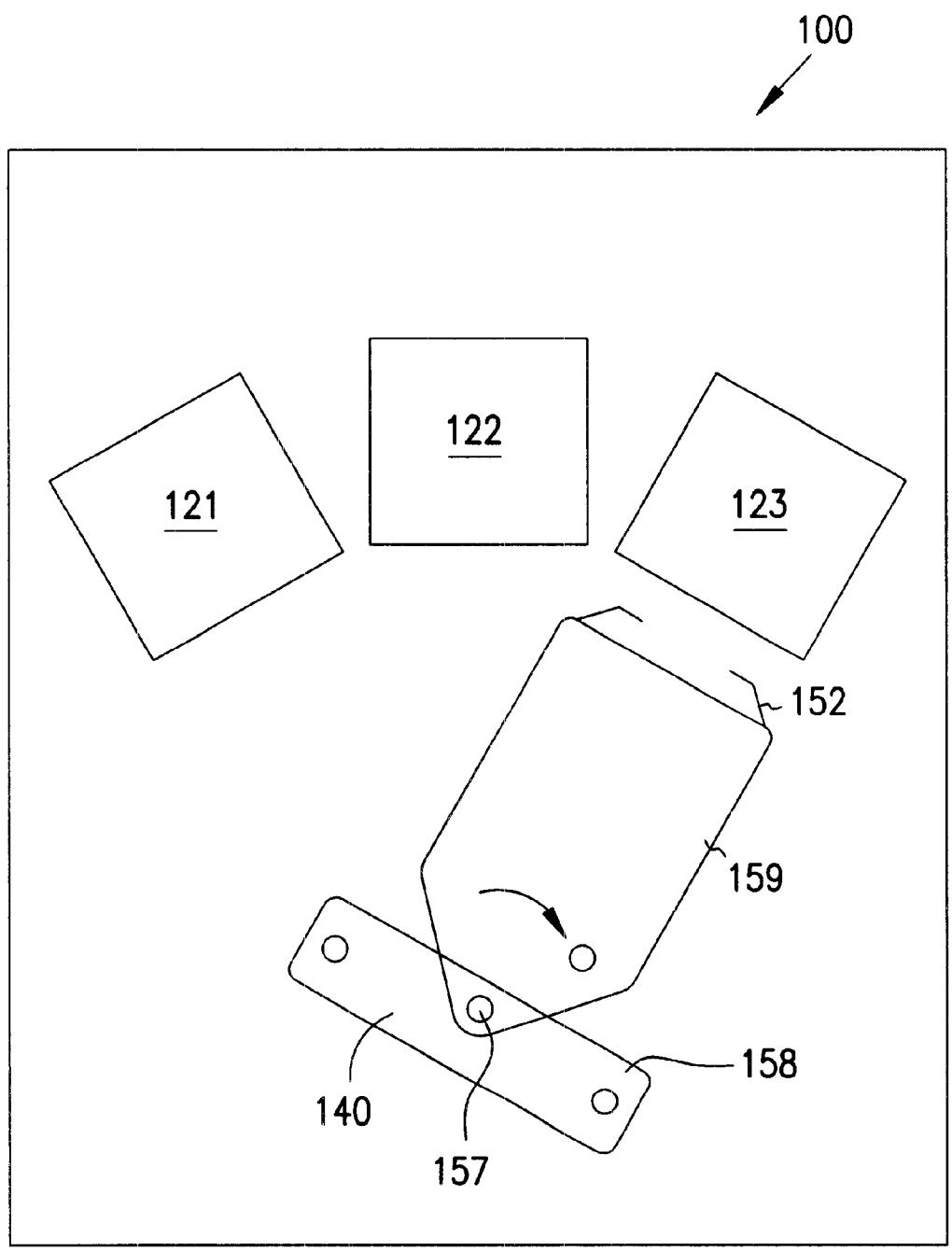
FIG. 5 shows a plan view of a data storage library according to another embodiment of the present invention.

FIG. 5 shows a plan view of data storage library 100 incorporating another embodiment of guide member 140 and media transport assemblies 150 and 151. In this embodiment, guide member 140 remains fixed while the first and second media transport assemblies 150 and 151 both include a first section 158 slidably coupled to guide member 140 and a second section 159 rotatably coupled to first section 158 at a pivot point 157, which is on an axis parallel to the shafts 141a and 141b. Second section 159 rotates to direct the first and/or second media transport assembly 150 and/or 151 to a storage slot of one of the first, second, or third storage sections. First media transport assembly 150 and second media transport assembly 151 each independently rotate to face a given slot or compartment in a given storage section. Thus, one assembly rotates moves radially in a radial direction $\theta^1$, while the other moves in a radial direction $\theta_2$. This helps improves the speed of data transfer and data seek since each assembly can work independently of the other one.

In some embodiments (not shown), guide member 140 is mounted on a guide member mounted to the bottom or top of the library that translates the guide member in a direction along the fronts of the storage sections and perpendicular to guide member 140. This provides for an X–Y motion configuration, as is known in the art. Other embodiments combine an X–Y motion configuration with the rotational motion of the embodiments of FIGS. 4A, 4B, or 5 to further provide more complex motions. Those skilled in the art will appreciate that other motion configurations can also be used with the data storage library.

As discussed above, data storage library 100 is coupled to controller 170 for controlling the actions of first and second media transport assemblies 150 and 151. In one embodiment, an operator fills one or more slots 124a–124n of one or more storage sections 121–123 with data storage media. The controller is programmed to know which slot contains which data. When a request for data is received by a main computer, the computer then directs media transport assembly 150 (or 151) to get the necessary medium and place it in one of drives 130. The controller controls the location and position of assembly 150 by rotating guide member 140 and/or driving assembly 150 up and down guide member 140 via driving member 156. If assembly 150 fails, the controller sends it to bottom portion 143 of guide member 140. The controller then actuates solenoid 159 which releases holding member 153 and assembly 151 is put into active duty.

FIG. 6 shows a flowchart of a method 600 in accord with one embodiment of the present invention. In method 600, a first block 602 includes sensing a failure of a media transport assembly. Sensing can include sensing various signals such as elapsed time of operation, error rates, and signature analysis, non-responsiveness, or other signals indicating that the assembly has failed or is about to fail. In block 604, the method includes moving or driving the failed media transport assembly to a non-obstructing location. As described above, this can include such actions as the failed assembly being driven to its respective end of the guide member, the failed assembly falling by gravity to an end, or it may be pushed by the other non-failed assembly. In block 606, method 600 includes using a second media transport assembly to perform data requests.

In another embodiment, both assemblies 150 and 151 are active simultaneously, and the controller controls them independently of each other. As discussed above, in such an embodiment, if one of the assemblies fails, it may be driven to its respective end of the guide member, it may fall by gravity to an end, or it may be pushed by the other non-failed assembly.

In one embodiment, controller 170 monitors the performance of either or both assemblies 150 and 151 and senses an impending failure of either assembly. Exemplary signals which could be monitored to predict impending failure include elapsed time of operation, error rates, and signature analysis, among others. In this embodiment, the failed assembly is moved out of the way prior to its total failure (or just at impending failure), as discussed above, and the non-failed assembly is either activated (if it had been inactive), or told by the controller that it is responsible for all data requests (if it had been previously active). Advantageously, switching to the second assembly before the total failure of the first assembly reduces downtime of the system and reduces the chance for data loss.

In one embodiment, both assemblies 150 and 151 include a rotational portion 159 (see FIG. 5). In such an embodiment, the controller independently controls the rotational and height positions of each assembly.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A data storage library comprising:
   a plurality of storage slots, each of the plurality of storage slots adapted for holding one or more data storage media;
   one or more media drives proximate the plurality of storage slots;
   a guide member;
   a first media transport assembly slidably coupled to the guide member for transferring data storage media between the storage slots and the media drive;
   a second media transport assembly slidably coupled to the same guide member; and
   a controller operatively coupled to each of the first media transport assembly and the second media transport assembly;
   wherein, in case of a failure of either the first media transport or the second media transport, the controller causes the non-failed media transport assembly to push the failed media transport assembly to a non-obstructing location along the guide member.

2. The data storage library of claim 1, wherein the guide member is vertically oriented.

3. The data storage library of claim 1, wherein the plurality of storage slots are configured in two or more columns storage sections arranged in an annular configuration.

4. The data storage library of claim 1, wherein the non-obstructing location is at either a top end or a bottom end of the guide member.

5. The data storage library of claim 1, wherein the controller is adapted to sense an impending failure of the first media transport or the second media transport.

6. The data storage library of claim 1, wherein the guide member comprises a first guide shaft and a second guide shaft, and wherein each media transport assembly includes a pair of holes for matably sliding along the first guide shaft and the second guide shaft.

7. The data storage library of claim 1, further comprising a rack gear parallel to the guide member, wherein both the first and the second media transport assemblies include a pinion gear for driving the media transport element along the rack gear up and down the guide member.

8. The data storage library of claim 1, wherein each media transport assembly includes a gripper portion for picking a data storage medium from a storage slot and placing the data storage medium into the media drive.

9. The data storage library of claim 1, wherein the second media transport assembly is removably coupled to an upper end of the guide member by a holding member.

10. The data storage library of claim 9, wherein the holding member is adapted to release the second media transport assembly if the first media transport assembly fails.

11. A data storage library comprising:
    a housing;
    a media storage area located within the housing;
    a media drive proximate the media storage area for reading information on the data storage media;
    a guide member vertically oriented proximate the media storage area;
    a first media transport assembly slidably coupled to the guide member for transferring the data storage media between the storage slots and the media drive; and
    a second media transport assembly slidably coupled to the guide member and located above the first media transport assembly,
    wherein the first and second media transport assemblies each include a first section slidably coupled to the guide member and a second section rotatable coupled to the first section such that the second section is rotatable in a horizontal plane about an axis parallel to the guide member.

12. The data storage library of claim 11, wherein the second section of each media transport assembly rotates independently of the second section of the other media transport assembly.

13. The data storage library of claim 11, wherein the second section of each media transport assembly rotates to direct the media transport assembly to a storage slot of one of the multiple storage sections.

14. The data storage library of claim 11, further comprising a controller coupled to the first and the second media transport assemblies, the controller controls a height and a rotation of each of the first and the second media transport assemblies.

15. The data storage library of claim 11, wherein the guide member comprises a first guide shaft and a second guide shaft, each guide shaft is approximately as high as the storage section, and wherein each media transport assembly includes a pair of holes for matably sliding along the first guide shaft and the second guide shaft.

16. The data storage library of claim 11, wherein the second media transport assembly is removably coupled to an upper end of the guide member by a holding member, the holding member is adapted to release the second media transport assembly if the first media transport assembly fails.

17. The data storage library of claim 11, further comprising a rack gear parallel to the guide member, wherein both the first and the second media transport assemblies include a pinion gear for driving the media transport element along the rack gear up and down the guide member.

18. The data storage library of claim 11, wherein the first media transport assembly is adapted for grasping a data storage medium and is rotatable about an axis parallel to the guide member, and wherein the second media transport assembly is adapted for grasping a data storage medium and is rotatable about an axis parallel to the guide member and wherein the first media transport assembly and the second media transport assembly each independently rotate.

19. The data storage library of claim 11, wherein the media storage area comprises multiple storage sections, each storage section having a plurality of storage slots arranged in a vertical column, each of the plurality of storage slots adapted for holding one or more data storage media, wherein the multiple storage sections are arranged in an angular configuration.

20. The data storage library of claim 19, wherein the guide member is rotatably coupled to the housing and wherein the guide member rotates to direct the first and the second media transport assembly to one of the multiple storage sections.

21. The data storage library of claim 11, further comprising means for positioning a failed media transport assembly to a non-obstructing location along the guide member.

22. The data storage library of claim 21, wherein the failed media transport assembly is pushed to a non-obstructing location along the guide member by the non-failed media transport assembly.

23. The data storage library of claim 21, wherein the first media transport assembly is adapted to go to a bottom end of the guide member by the force of gravity if the first media transport assembly fails.

24. A data storage library comprising:

a housing;

a media storage area located within the housing;

one or more media drives proximate the media storage area for reading information on the data storage media;

a guide member vertically oriented proximate the media storage area;

a first media transport assembly slidably coupled to the guide member for transferring the data storage media between the storage slots and the one or more media drives;

a second media transport assembly slidably coupled to the same guide member and located above the first media transport assembly; and a controller coupled to the first and the second media transport assemblies, the controller controls a position of each of the first and the second media transport assemblies;

wherein the second media transport assembly is coupled to an upper end of the guide member by a holding member, the holding member is adapted to release the second media transport assembly if the first media transport assembly fails.

25. The data storage library of claim 24, wherein the first media transport assembly and the second media transport assembly are simultaneously active in transferring the data storage media between the storage slots and the one or more media drives.

26. The data storage library of claim 24, wherein the media storage area comprises multiple storage sections, each storage section having a plurality of storage slots arranged in a vertical column, each of the plurality of storage slots adapted for holding one or more data storage media.

27. A data storage library comprising:

a housing;

a media storage area located within the housing;

one or more media drives proximate the media storage area for reading information on the data storage media;

a guide member vertically oriented proximate the media storage area;

a first media transport assembly slidably coupled to the guide member for transferring the data storage media between the storage slots and the one or more media drives, a second media transport assembly slidably coupled to the same guide member and located above the first media transport assembly; and a controller coupled to the first and the second media transport assemblies, the controller controls a position of each of the first and the second media transport assemblies;

wherein the second media transport assembly is coupled to an upper end of the guide member by a holding member, the holding member is adapted to release the second media transport assembly if the controller senses that the first media transport assembly is failing.

28. A method for transferring a data storage medium within a data storage library including a storage section having a plurality of storage slots, each of the plurality of storage slots adapted for holding one or more data storage media, a media drive proximate the plurality of storage slots for reading information on the data storage media, and a vertically oriented guide member proximate the plurality of storage slots, the method comprising:

driving a first media transport assembly up and down the guide member to retrieve a data storage medium and deliver the data storage medium to the media drive;

driving a second media transport assembly up and down the guide member to retrieve a data storage medium and deliver the data storage medium to the media drive; and sensing an impending failure of either the first or the second media transport assemblies and driving the first or second media transport assembly to a non-obstructing location along the guide member before the first or second media transport assembly fails.

29. The method of claim 28, wherein sensing an impending failure comprises sensing one or more signals indicating an impending failure of either the first or the second media transport assembly 30. A method for transferring a data storage medium within a data storage library including a storage section having a plurality of storage slots, each of the plurality of storage slots adapted for holding one or more data storage media, a media drive proximate the plurality of storage slots for reading information on the data storage media, and a vertically oriented guide member proximate the plurality of storage slots, the method comprising:

driving a first media transport assembly up and down the guide member to retrieve a data storage medium and deliver the data storage medium to the media drive;

sensing a failure of the first media transport assembly and driving the first media transport assembly to a non-obstructing location along the guide member; and activating a second media transport assembly located on the same guide member to retrieve and deliver the data storage medium to the media drive, wherein the second media transport assembly is coupled to an upper end of the guide member by a holding member, the holding member being adapted to release the second media transport assembly if the first media transport assembly fails.

31. The method of claim 30, further comprising driving the second media transport assembly independently of the first media transport assembly.

32. The method of claim 30, wherein driving the first media transport assembly to a non-obstructing location along the guide member comprises driving the first media transport assembly to a bottom portion of the guide member.

33. A data storage library comprising:

a plurality of storage slots, each of the plurality of storage slots adapted for holding one or more data storage media;

one or more media drives proximate the plurality of storage slots;

a guide member;

a first media transport assembly slidably coupled to the guide member for transferring data storage media between the storage slots and the media drive;

a second media transport assembly slidably coupled to the same guide member, wherein the second media transport assembly is removably coupled to an upper end of the guide member by a holding member; and means for positioning the first media transport assembly or the second media transport assembly to a location along the guide member wherein the first media transport assembly or the second media transport assembly is not blocking access to the plurality of storage slots if the first media transport assembly or the second media transport assembly fails.

34. The data storage library of claim 33, wherein the holding member is adapted to release the second media transport assembly if the first media transport assembly fails.

35. The data storage library of claim 33, wherein the guide member is vertically oriented and the means for positioning comprises gravity forcing the first media transport assembly to slide to a bottom end of the guide member if the first media transport assembly fails.

36. The data storage library of claim 33, wherein the means for positioning comprises a driving member coupled to the failed media transport assembly to drive the failed media transport assembly to a non-obstructing location along the guide member.

37. The data storage library of claim 33, wherein each media transport assembly includes a driving member and the means for positioning comprises the non-failed media transport assembly pushing the failed media transport assembly to a non-obstructing location along the guide member.

38. A data storage library comprising:

a housing;

a media storage area located within the housing;

a media drive proximate the media storage area for reading information on the data storage media;

a guide member vertically oriented proximate the media storage area;

a first media transport assembly slidably coupled to the guide member for transferring the data storage media between the storage slots and the media drive; and a second media transport assembly slidably coupled to the guide member and located above the first media transport assembly, wherein the second media transport assembly is removably coupled to an upper end of the guide member by a holding member, the holding member is adapted to release the second media transport assembly if the first media transport assembly fails.

39. The data storage library of claim 38, wherein the first media transport assembly is adapted for grasping a data storage medium and is rotatable about an axis parallel to the guide member, and wherein the second media transport assembly is adapted for grasping a data storage medium and is rotatable about an axis parallel to the guide member and wherein the first media transport assembly and the second media transport assembly each independently rotate.

* * * * *

UNITED STATES PATENT AND TRADEMARK OFFICE
CERTIFICATE OF CORRECTION

PATENT NO.    : 6,493,604 B1
DATED         : December 10, 2002
INVENTOR(S)   : Glendon D. Kappel and Timothy Carlyle Schooler It is certified that error appears in the above-identified patent and that said Letters Patent is hereby corrected as shown below:

<u>Column 3,</u>
Line 16, delete the word "fill" and insert the word -- full --

<u>Column 7,</u>
Line 32, delete the word "annular" and insert the word -- angular --

Signed and Sealed this

Twenty-second Day of July, 2003

JAMES E. ROGAN
*Director of the United States Patent and Trademark Office*